United States Patent
Weber et al.

(10) Patent No.: US 11,073,809 B2
(45) Date of Patent: *Jul. 27, 2021

(54) DEVICES, SYSTEMS, AND METHODS FOR CONTROLLING ELECTRICAL FIXTURES

(71) Applicant: Hubbell Incorporated, Shelton, CT (US)

(72) Inventors: Theodore E. Weber, Round Rock, TX (US); Mark A. Rosenau, West Lake Hills, TX (US); Thomas J. Hartnagel, Round Rock, TX (US); Michael L. Muecke, Round Rock, TX (US); Terrence R. Arbouw, Georgetown, TX (US)

(73) Assignee: Hubbell Incorporated, Shelton, CT (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/556,618

(22) Filed: Aug. 30, 2019

(65) Prior Publication Data

US 2019/0384248 A1 Dec. 19, 2019

Related U.S. Application Data

(63) Continuation of application No. 15/495,159, filed on Apr. 24, 2017, now Pat. No. 10,416,631.
(Continued)

(51) Int. Cl.
*G05B 19/042* (2006.01)
*G06F 13/364* (2006.01)
(Continued)

(52) U.S. Cl.
CPC ....... *G05B 19/0423* (2013.01); *G06F 13/364* (2013.01); *G06F 13/4282* (2013.01); *H04W 8/005* (2013.01); *Y02D 10/00* (2018.01)

(58) Field of Classification Search
CPC ............... G05B 19/0423; G06F 13/364; G06F 13/4282; Y02D 10/00; H04W 8/005
See application file for complete search history.

(56) References Cited

U.S. PATENT DOCUMENTS 8,887,280 B1* 11/2014 Dickinson ........... H04L 63/1458
726/23
2003/0135625 A1* 7/2003 Fontes .................... H04L 63/12
709/228
(Continued)

OTHER PUBLICATIONS

PCT/US2017/029108 International Search Report and Written Opinion dated Jun. 30, 2017 (24 pages).

*Primary Examiner* — Farley Abad
(74) *Attorney, Agent, or Firm* — Michael Best & Friedrich LLP

(57) ABSTRACT

Devices, systems and methods for controlling electrical loads in one or more areas. A method includes transmitting, with a microcontroller via a transceiver, a sync packet including a unique address of the lighting fixture control module to a bus. The method includes listening, via the transceiver, on the bus. The method includes placing the microcontroller into a master operation mode when a master sync timeout period expires without receiving a second sync packet including a unique address for a second master device from the bus. The method includes placing the microcontroller into a subordinate operation mode when the second sync packet is received from the bus during the master sync timeout period.

18 Claims, 6 Drawing Sheets

Related U.S. Application Data

(60) Provisional application No. 62/326,419, filed on Apr. 22, 2016.

(51) Int. Cl.
    *G06F 13/42*     (2006.01)
    *H04W 8/00*     (2009.01)

(56) References Cited

U.S. PATENT DOCUMENTS

| | | |
|---|---|---|
| 2006/0009863 A1 | 1/2006 | Lingemann |
| 2007/0260764 A1* | 11/2007 | Summers .......... H04L 29/12254 710/9 |
| 2008/0136334 A1* | 6/2008 | Robinson ............... H05B 47/18 315/151 |
| 2008/0288607 A1* | 11/2008 | Muchow ............. G06F 11/0724 709/209 |
| 2009/0290520 A1 | 11/2009 | Roberts |
| 2012/0280625 A1* | 11/2012 | Zampini, II ........... H05B 45/10 315/151 |
| 2013/0201316 A1 | 8/2013 | Binder et al. |
| 2014/0167620 A1 | 6/2014 | Chobot |
| 2014/0246993 A1* | 9/2014 | Catalano ............. H05B 47/105 315/312 |
| 2014/0265633 A1 | 9/2014 | O'Brien et al. |

* cited by examiner

DEVICES, SYSTEMS, AND METHODS FOR CONTROLLING ELECTRICAL FIXTURES

CROSS-REFERENCE TO RELATED APPLICATIONS

The present application is a continuation of, and claims the benefit of the filing date of co-pending U.S. patent application Ser. No. 15/495,159, filed Apr. 24, 2017, which claims benefit under 35 U.S.C. § 119(e) from U.S. Provisional Patent Application Ser. No. 62/326,419, filed Apr. 22, 2016, titled "DEVICES, SYSTEMS, AND METHODS FOR CONTROLLING ELECTRICAL FIXTURES".

BACKGROUND

Intelligent lighting systems provide more efficient and effective lighting in buildings and outdoor areas. Such systems include multiple lighting fixtures, controllers (e.g., microprocessors), and sensors that communicate and interoperate with one another. Intelligent lighting systems may include occupancy sensors to help reduce energy consumption and light pollution (e.g., by reducing the usage of lighting operating at night) and dimmer circuits to control the light intensity of light sources. Increasing the size of an area covered by an intelligent lighting system increases the number of fixtures and sensors required, and thus increases the number and complexity of the controllers and fixtures.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
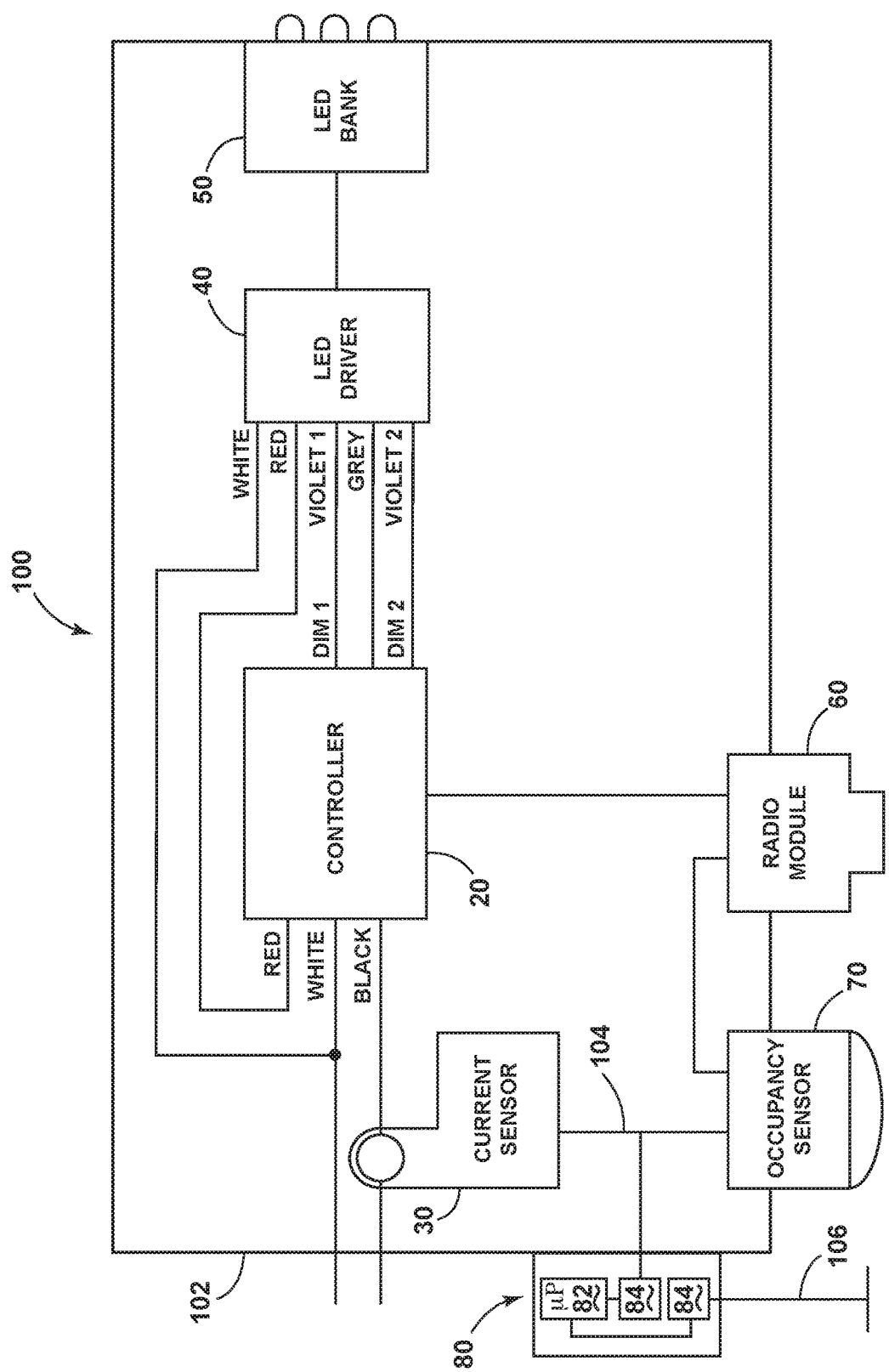
FIG. 1 is a block diagram of an integrated lighting fixture, according to some embodiments.

Skilled artisans will appreciate the elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding of embodiments of the present invention so as not to obscure the disclosure with details that will be readily apparent to those of ordinary skill in the art having the benefit of the description herein.

DETAILED DESCRIPTION OF THE INVENTION

Lighting systems operate to control electrical loads (e.g., LED lighting fixtures) for rooms or zones, multiple rooms or zones that are combined into areas, and multiple areas. In some embodiments, lighting systems operate to control electrical loads across entire buildings and grounds that are separated by rooms, hallways, and/or exterior areas.

In some embodiments, lighting systems can employ an area/zone/group assignment strategy. In some embodiments, lighting fixtures or other devices may be programmed to participate in only one area; however, they may belong to one or all of the available zones and groups within the area. Assignments in the areas, zones, and groups can be made through a commissioning tool (e.g., a computer program). In some embodiments, areas are used as a method of separating buildings or floors, zones to separate individual room or locations of control, and groups to configure control assignments within the rooms or locations.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Embodiments presented herein provide, among other things, devices, systems, and methods for controlling lighting fixtures.

One example embodiment provides a lighting fixture. The lighting fixture includes a controller, a sensor, an internal bus communicatively coupling the controller and the sensor, and an edge gate. The edge gate includes a microprocessor communicatively coupled to the internal bus and an external bus. The microprocessor is configured to transmit, to the external bus, a sync packet including a unique address of the edge gate. The microprocessor is configured to listen on the external bus. The microprocessor is configured to, when a master sync timeout period expires without receiving a second sync packet including a unique address for a second master device from the external bus, enter a master operation mode. The microprocessor is configured to, when the second sync packet is received from the external bus during the master sync timeout period, enter a subordinate operation mode.

Another example embodiment provides a method for operating a lighting fixture control module. The method includes transmitting, with a microcontroller via a transceiver, a sync packet including a unique address of the lighting fixture control module to a bus. The method includes listening, via the transceiver, on the bus. The method includes placing the microcontroller into a master operation mode when a master sync timeout period expires without receiving a second sync packet including a unique address for a second master device from the bus. The method includes placing the microcontroller into a subordinate operation mode when the second sync packet is received from the bus during the master sync timeout period.

FIG. 1 illustrates an example embodiment of an integrated lighting fixture 100. The integrated lighting fixture 100 includes a lighting fixture housing 102, a controller (e.g., a fixture level controller 20), a current sensor 30, an LED driver 40, an LED bank 50, a radio module 60, an occupancy sensor 70 and an edge gate 80. The fixture controller 20 is communicatively coupled to the LED driver 40, which is coupled to and controls the LED bank 50. In the example illustrated, the fixture controller 20 is communicatively coupled to the current sensor 30, the radio module 60, the occupancy sensor 70, and the edge gate 80 via an internal bus 104 (for example, a fixture control network (FCN) bus). In some embodiments, the internal bus 104 includes one or more conductors connecting the components in a daisy chain, and operating using the RS-485 serial communication standard.

In some embodiments, the occupancy sensor 70 is a passive infrared sensor (PIR), for example, mounted directly to or on the lighting fixture housing 102 or extending through the lighting fixture housing 102. The occupancy sensor 70 is configured to detect occupancy, read daylight levels, and provide communications with Bluetooth Low Energy (BLE) devices. The occupancy sensor 70 may be operated in an indoor or outdoor environment—mounted to a lighting fixture, a pole, a building, or other structure—to detect occupants.

The edge gate 80 includes a microprocessor 82 and two transceivers 84. The transceivers 84 are communicatively coupled to the microprocessor 82 (e.g., via integrated serial or I/O ports) and are configured to send and receive communications on one or more buses using a suitable protocol. In some embodiments, the transceivers 84 are RS-485 transceivers. The microprocessor communicates on the internal bus 104 of the lighting fixture 100 and an external bus 106 (e.g., an FX bus) via the transceivers 84. In some embodiments, the external bus 106 includes one or more conductors connecting the components in a daisy chain or multi-drop configuration, and operating using the RS-485 serial communication standard. As described more particularly below, the edge gate 80 receives communications for components of the integrated lighting fixture 100 from the external bus 106 and transmits them onto the internal bus 104. Similarly the edge gate 80 receives communications from components of the integrated lighting fixture 100 from the internal bus 104 and transmits them onto the external bus 106.

Integrated lighting fixture 100 is optionally connected to one or more sensors, one or more switches, and one or more loads. Example sensors optionally connected to the integrated lighting fixture 100 include a temperature sensor, a current sensor, an occupancy sensor, a chemical sensor, a motion sensor, and the like. The fixture controller 20 can also include, or be connected to a communication device, for example a wireless communication device using radio module 60, for communicating with a user. The user can receive information and send instructions or commands to the fixture controller 20 to control the operation of the loads. The loads can be automatically controlled and adjusted by fixture controller 20 based on a set profile, input from the switches, input from the sensors, input from a user, or combinations of the foregoing. In some embodiments, the fixture controller 20 automatically responds to input from the user, switches, sensors, or combinations of the foregoing, and adjusts the power to the loads (e.g., to increase energy efficiency). Although the various example embodiments discussed herein use lighting units as the loads, the devices and methods described herein can be adapted for use with other electronic devices.

Figure 2:
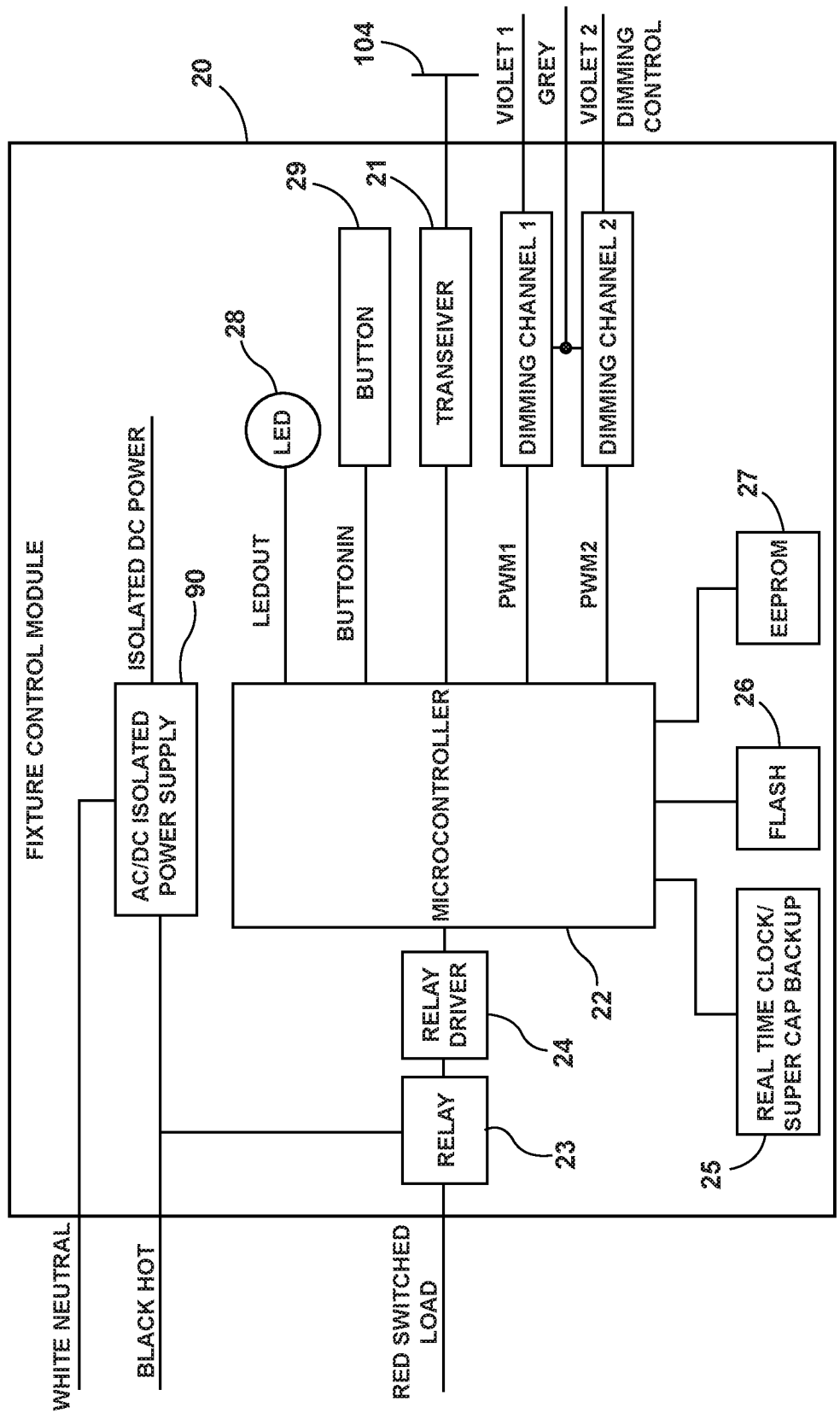
FIG. 2 is a block diagram of a lighting fixture controller, according to some embodiments.

FIG. 2 schematically illustrates an example fixture controller 20. Fixture controller 20 includes a transceiver 21, a microcontroller 22, a relay 23, a relay driver 24, real time clock (RTC) 25, flash memory 26, EEPROM 27, an LED 28, control button 29, dimming channel 1, dimming channel 2, and an AC/DC Isolated power supply 90. The microcontroller 22 passes data between the peripheral modules and components external to the fixture controller 20 via the transceiver 21 and the internal bus 104. In some embodiments, the transceiver 21 is an RS-485 transceiver (e.g., communicating to a serial port of the microcontroller 22). The microcontroller 22 also controls access to the real time clock 25. In some embodiments, the microcontroller 22 also includes an Ethernet connection, for example to an Ethernet switch (not shown). An Ethernet switch enables daisy-chaining several fixture controllers 20 from one device to another, giving the appearance of a common multi-drop bus, although Ethernet is a point-to-point standard.

As illustrated, the fixture controller 20 may be wired directly to a load (for example, controllable via the relay 23 and the relay driver 24). In some embodiments, the fixture controller 20 may be configured to interact with a receptacle, either through a hard-wired connection or through wireless communication. In the embodiment illustrated, the fixture controller 20 provides two dimming control signals for loads over dimming channels 1 and 2, for example a 0-10V DC control signal output that can control dimmable ballasts and LED light sources. In some embodiments, dimming channel 1 is used to control the intensity (i.e., brightness) of a light source, and dimming channel 2 is used to control the chromaticity (i.e., color temperature) of the light source.

The RTC 25 allows the microcontroller 22 to act as a time server for the peripheral modules so they can execute time-based functions such as schedules and active/inactive times. In some embodiments, the RTC 25 includes capacitor-based backup power, enabling it to keep accurate time for at least 72 hours after external power is removed. In various embodiments, each fixture controller 20 is configured to independently schedule tasks utilizing its own internal real time clock 25, which may be synchronized from a Bluetooth Low Energy enabled device with the appropriate software application to access the fixture controller 20. In some embodiments, the fixture controller 20 is capable of storing up to 16 programmable scheduled events (1 through 16). In one example embodiment, the fixture controller 20 is capable of being individually or globally controlled by a remote peripheral device.

In some embodiments, the LED 28 and the control button 29 are used to control a load or dimmable light source coupled to the fixture control module 20. In ordinary operation, LED 28 indicates the current relay state. For example, if LED 28 is in the "On" state, this indicates that the relay 23 is closed, whereas having LED 28 in the "Off" state indicates that the relay 23 is open.

In some embodiments, a short press (e.g., approximately one second) of control button 29 toggles the state of relay 23 from on to off or off to on. In some embodiments, pressing and holding control button 29 for ten seconds, until LED 28 flashes three times per second, will reset the fixture controller 20 to factory defaults.

In some embodiments, two dimmers coupled to fixture controller 20 can be controlled independently from the control button 29. For example, a press and hold of the control button 29 starts ramping down the first dimmer. A second release and hold of the control button 29 starts ramping up the first dimmer. A third release and hold of the control button 29 ramps down the second dimmer. A fourth release and hold of the button 29 ramps up the second dimmer. When an upper dimmer limit (e.g., 100%) or a lower dimmer limit (e.g., 10%) is reached, the LED 28 will blink once. In some embodiments, this cycle repeats with every press and hold of the control button 29. A short press of the button will turn relay 23 to "Off" state. When the relay is turned back on, the sequence begins again.

In some embodiments, the control button 29 acts as an override button, which allows a user to directly control the loads at the controller 20. For example, a quick press of the control button 29 can toggle the state of the load while a prolonged press of the control button 29 can cause the load to slowly lower to a minimum or increase to a maximum level. Release of the control button 29 cancels the lower or increase to leave the light at a desired level. This may also allow an installer to verify operation of the controller prior to setting up other manual controls. In some embodiments, the fixture controller 20 may include more than one override button.

In some embodiments, a computer program is provided that allows a user to the control the loads connected to the fixture controller 20. Many types of programs can be used, including computer programs or applications for phones, tablets, smart televisions, or other devices. Various complex applications can be achieved with the fixture controller 20 and selected by a user including daylight harvesting. Daylight harvesting can utilize a daylight sensor and a fixture controller 20 connected to dimmable loads. The fixture controller 20 receives signals from the daylight sensor about the amount of light in a room and adjusts the dimmable loads so that the combined light output stays at a predetermined level. In some embodiments, a switch can be used so that users can also manually adjust the level of light in the room, temporarily overriding the automatic control. The time period for override can be a set amount of time or until occupancy sensor 70 determines vacancy in the room. Light from different sources is additive so the contribution of natural light can be used in conjunction with the contribution of controlled artificial light to produce the specified lighting level in the appropriate space. Reducing the output of the artificial light reduces the energy usage of the fixture while still producing the required design light level due to the presence of natural light in the space.

In some embodiments, multiple fixture controllers 20 are connected together to form different zones. Multiple fixture controllers 20 are capable of handling larger numbers of loads or groups of loads. When connected together (for example, through the edge gate 80 via an external bus 106), the fixture controllers 20 can allocate greater resources to communicate with one another. It is possible to connect switch stations, occupancy sensors, and daylight sensor to any fixture controller 20 within the zone and share functionality across all fixture controllers 20 in the zone. If a zone contains more than one fixture controller 20, loads are assigned based on the numeric value of the unique network address (e.g., a MAC address) for the fixture controller 20. For example, the fixture controller 20 with the highest unique address can contain load #1 and the controller with the next highest address will have the next load or loads and so on. The occupancy sensor 70 will automatically control all loads up to the maximum allowed.

Figure 3:
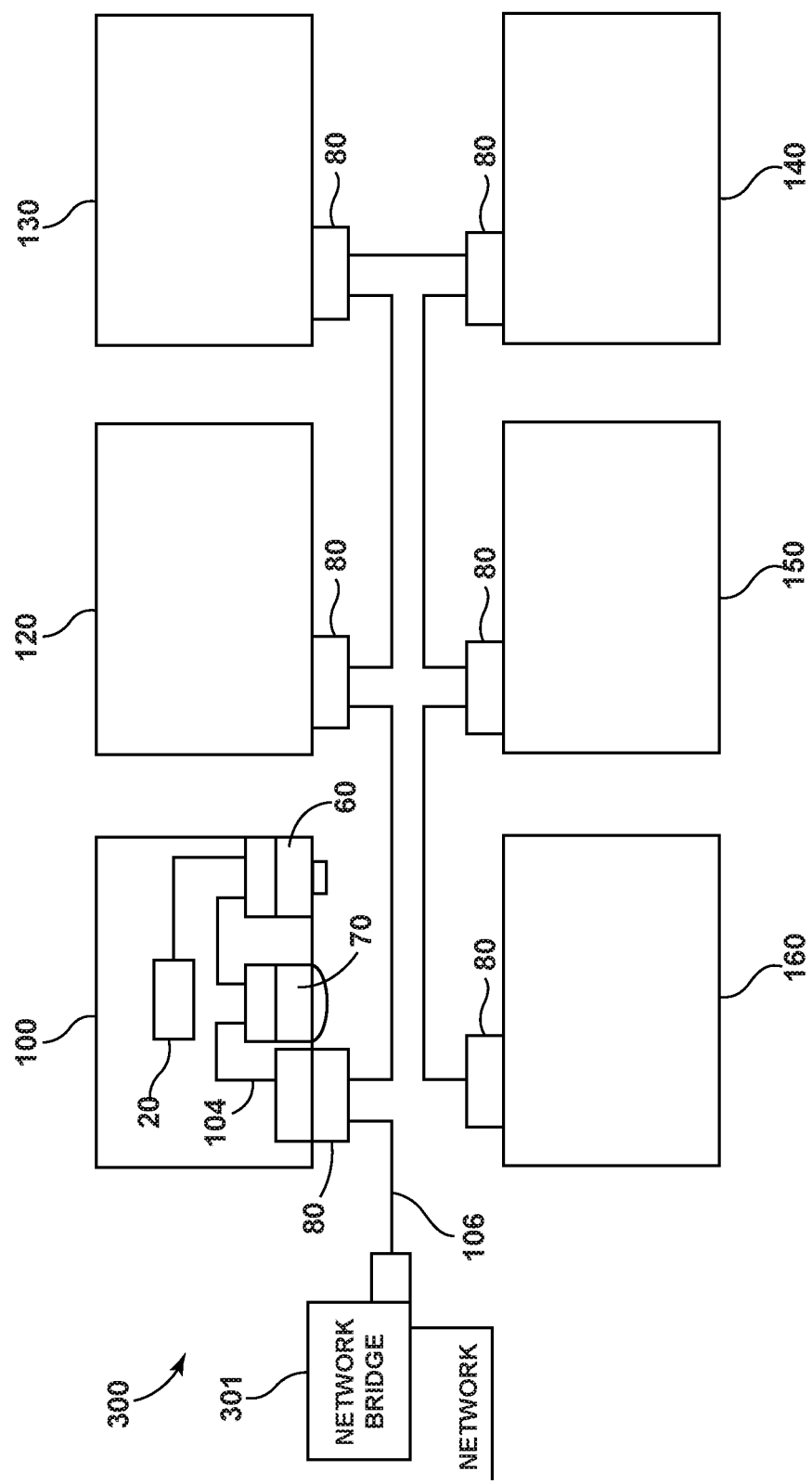
FIG. 3 is a block diagram of a lighting fixture network, according to some embodiments.

An example lighting fixture network 300, including multiple instances of the integrated lighting fixture system 100, is illustrated in FIG. 3. The lighting fixture network 300 includes lighting fixtures 100, 120, 130, 140, 150, and 160, coupled to each other in a daisy-chain manner on the external bus 106. The remaining end of the daisy chain is coupled to a network bridge 301 that enables connectivity to other lighting fixtures, controllers, or loads. The lighting fixtures of the network 300 are coupled to each other using edge gates 80 available in each fixture.

In some lighting control systems, a Time Domain Multiplexing scheme is employed to control the utilization of the data bus (e.g., the internal bus 104 and the external bus 106). The time domain is sliced into equal "time slots" by the master device. In round robin fashion, each device on the data pipe is allowed a time slot in which to send a data packet (for example, containing up to 64 characters). After each device is given the opportunity to send exactly one packet, the process is repeated. For example, a total of 10 time slots of 10 ms each may be set aside within each repeated cycle, allowing up to 10 devices to share the data pipe with a total cycle time of 100 ms. The time to send a single byte (including start and stop bits) is 86.06 µs. The master sends a sync frame to indicate the start of each time slot (e.g., containing 4 bytes and taking about 0.3472 ms to transmit). The slot device then sends a single data packet if there is any data to send. The data packet may contain up to 64 bytes, taking up to 5.56 ms to send. A slave device must begin to send the data packet within 4 ms of the end of the sync packet to fit the packet within the available time slot (e.g., 10 ms−5.56 ms−0.3472 ms=4.0928 ms dead time available). In some embodiments, the master device waits 1 ms after sending the slot 0 sync frame before sending the master packet. As a consequence, a slave device starts to send its slot data packet as soon as possible following the receipt of its slot sync frame.

Devices connected to a data bus are allocated slots in the TDMA cycle as defined in Table 1-1.

TABLE 1-1

| Time Slot Allocation | |
|---|---|
| Device | Slot |
| Master | 0 |
| Switches | 1-8 |
| BLE | 9 |

In some embodiments, the slot address for switches is set via a rotary selector. Each switch device is set to a unique slot number. The master uses sync frames to indicate the start of each time slot. As noted above, the sync frames are 4 byte (0.3472 ms) messages. Each contains a fixed start of sync frame character, a data character listing the slot number, a byte stating whether the slot is assigned and to what type of unit, and a simple checksum (see Table 1-2).

TABLE 1-2

| TDMA Sync Frame Format | | | | | | | | |
|---|---|---|---|---|---|---|---|---|
| BYTE | 7 | 6 | 5 | 4 | 3 | 2 | 1 | 0 |
| 0 | | | | Sync Frame Start (0x02) | | | | |
| 1 | | Port# | | | | Time Slot# | | |
| 2 | | | | Deprecated | | | | |
| 3 | | | | Checksum | | | | |

Note:
In some embodiments, byte #2 is no longer used but is still included for legacy compatibility. Each packet may be up to 64 bytes long. A Device Instance byte is made up of the port and slot numbers. The bit packing is shown in Table 1-3 and is identical to that used in byte #1 of the Sync frame.

TABLE 1-3

| Device Instance Byte Definition | | | | | | | |
|---|---|---|---|---|---|---|---|
| 7 | 6 | 5 | 4 | 3 | 2 | 1 | 0 |
| Port# | | | Time Slot# | | | | |

As lighting fixtures become more intelligent by adding local control and sensors to each fixture, it becomes more desirable to connect multiple fixtures together. This allows the fixtures to work together, for example, by sharing information such as occupancy indications or switch inputs. Time domain multiplexing gives each device on the bus a time slot, whether it uses it or not. As a consequence, in a wired system, as more and more fixtures are connected together via a communication bus, the frequency at which each device is allowed to send messages is reduced. This can result in delayed messages from the distributed sensors in the fixtures, leading to a slower response time to external stimuli.

For example, consider a space that has eight fixtures wired together, each with an occupancy sensor and relay controller. It may be useful for the sensor in each fixture to indicate to the relay controllers in the rest of the fixtures that are wired together that an occupancy event has occurred. One sensor detects occupancy and then waits its turn to send a message to the other fixtures on the bus. With sixteen devices (eight occupancy sensors and eight relay controllers) on the bus, the potential delay is relatively short. The occupancy sensor does not have to wait long to get access to the bus to command the lights to turn on. However, as more devices are added, the potential delay becomes longer until it is ultimately perceptible, and thus unacceptable to the user. For example, a delay of 50-100 ms is perceptible to a user. This situation is made worse by the fact that each fixture may contain several devices. Consequently, the number of message slots needed for each fixture is compounded.

As illustrated in FIG. 3, the edge gate 80 allows a large number of fixtures to be connected together while still preserving the responsiveness of the connected system. Each lighting fixture includes an edge gate 80, which provides a separation of message traffic within the fixture (e.g., on the internal bus 104) from traffic on the inter-fixture bus (e.g., external bus 106). In some embodiments, the internal bus 104 is referred to as the Fixture Control Network (FCN) and the external bus 106 is known as the FX bus.

As described in detail below, a single message slot is allotted to each edge gate 80 on the external bus 106. Each edge gate determines what devices are attached to its internal bus 104. One of the devices (for example, the controller 20) must have a pre-assigned unique address. The edge gate assumes this unique address and uses it to represent all of the devices on the internal bus 104 to the external bus 106. Thus a single unique address is exposed to the external bus 106.

There is a single timing master device (e.g., one of the edge gates 80) on an FX bus. The remaining devices on the FX bus are subordinate devices. A timing master determines when the subordinates on the FX bus are allowed to communicate. An edge gate 80 aggregates messages from the internal bus 104 and sends them out when it detects its unique address, as described below. As a consequence, internal message traffic is not exposed to the external bus 106, and thus the timing and response time of the connected system is deterministic. As described more particularly below, the edge gates that are connected together on an FX bus negotiate for mastership based on their assumed unique addresses. Because one of the edge gates is a master, no additional devices are necessary to provide the bus timing, thus reducing cost and complexity of the system.

In some embodiments, the FX network is a semi-private bus allowing communication among multiple devices (e.g., lighting fixtures, fixture control modules, edge gates, and smart sensors) on a single RS-485 serial pair. In some embodiments, the FX bus supports up to 128 total devices per wire. However, in some cases, response timing may limit the total number of devices directly on the FX bus to a lower number (e.g., 32). In some embodiments, the maximum allowed latency for a high priority device is 100 ms and the maximum latency for low priority devices is 1s. Other examples of devices on the FX bus include combinations of the following: a HubbNet Bridge, a NXBTR Bluetooth Bridge, slave devices that use the timing master's unique address (a maximum of 15), a mesh radio module, and the like.

In some embodiments, devices on the FX bus have a globally unique 32-bit address (e.g., a MAC address). As described more particularly below, a sync packet containing the device address (e.g., a unique address such as a MAC address) is used by the timing master to notify each device of its opportunity to send a message. The messages (i.e., data packets) sent by the master or subordinate may follow an addressing scheme different than the addressing scheme utilized on the FX bus. The unique address in the sync is used to select which device may send a message. When the timing master has a message to send to the network, the sync contains its own unique address.

As described in detail below, the FX network operates as a master/subordinate network with variable timing. In some embodiments, the timing master issues a sync, followed by a unique address, and then an idle time. A subordinate device recognizes the sync, address, and idle time in near real time. When the subordinate device recognizes the address as its unique address, it has 500 μs to initiate the sending of any queued messages. If no subordinate initiates a serial message after 750 μs, the timing master may start a new sync. After complete reception of a received message, the master may initiate a new timing sequence (i.e., send a new sync) after 750 μs.

The format of the sync frame, according to some embodiments, is defined in Table 2.

TABLE 2

| | | | FX Sync Frame Format | | | | |
|---|---|---|---|---|---|---|---|
| BYTE | 7 | 6 | 5 | 4 | 3 | 2 | 1 | 0 |
| 0 | | | | FX Sync Frame (0x04) | | | | |
| 1 | | mode | | Port# | | Address Slot# (0-15) | | |
| mode: | | normal mode: | | | | hash mode: | | |
| 2 | | | Unique 32-bit | | | | hash type | |
| 3 | | | Address | | | | hash value | |
| 4 | | | | | | | reserved | |
| 5 | | | | | | | reserved | |
| 6 | | | | reserved | | | | |
| 7 | | | | Checksum to 0xFF | | | | |

As shown in table 2, the sync frame is eight bytes in length. The 0th byte is used to identify the frame as a sync frame. The 1st byte is used to identify a mode (bits 6-7), a port (bits 4-5), and an address slot (bits 0-3). As described in detail below, the mode may be, for example, a normal mode, used to control and send traffic on the FX bus, or a hash mode, used in subordinate device discovery. The port identifies which of the physical ports on a multi-port device is being used. This is provided for legacy compatibility. The time slot is used to identify devices that borrow the unique address of another device, and supports up to sixteen devices (e.g., address.0, address.1, address 2, etc.). When the mode bits indicate a normal mode, then the 2nd-5th bytes are used to store a 32-bit unique address. When the mode bits indicate hash mode, then the 2nd byte is used to indicate a hash type. The 3rd byte contains the hash value (e.g., 0-255), and the 4th and 5th bytes are reserved. Hash types and values are described in detail below. In some embodiments, the 6th byte is reserved. The 7th byte is used as a checksum (e.g., to 0xFF).

In some embodiments, subordinate devices are configured to receive a sync and packet with no idle time in between the end of sync and beginning of the packet. This allows for more efficient use of the bus because the master may send the sync and data as one stream of data. Additionally, any device may begin sending a data packet in as little as 100 µs after the end of a sync, which is less than the minimum idle detect time. In some embodiments, there is a minimum of idle time (e.g., 750 µs) between the end of any data packet and the next sync. Devices may depend on this interval to detect that the bus is idle and to prepare themselves for the reception of the next message. For example, a subordinate can expect to receive a sync, a data packet, or a combined data block consisting of a sync followed by a data packet. Tables 3-1, 3-2, and 3-3, shown below, define some example timing sequences on an FX bus.

Table 3-1 shows a timing sequence where a subordinate transmits a full-payload packet (e.g., 64 bytes).

TABLE 3-1

FX Sync Frame and Packet Transmission
Timing for a Full-Payload Packet

|  | Bytes | Time (µs) |
|---|---|---|
| Sync Packet | 8 | 656 |
| Bus Idle | max | 500 |
| Data Packet | 64 | 5560 |
| Bus Idle | min | 750 |
| Total |  | 7466 |

The sequence shown in table 3-1 begins with the transmission of the sync packet by the timing master, which includes the unique address of the subordinate that is allowed to transmit on the bus. As shown, the subordinate has a time limit (e.g., up to 500 µs) where the bus is idle to begin transmitting the data packet. After the data packet is transmitted, the timing master delays for a bus idle time (for example, 750 µs). The time on the bus required to transmit a full 64-byte packet is 7.466 ms.

Table 3-2 shows a timing sequence where a subordinate transmits a minimal-payload packet (e.g., 28 bytes).

TABLE 3-2

FX Sync Frame and Packet Transmission
Timing for a Minimal-Payload Packet

|  | Bytes | Time (µs) |
|---|---|---|
| Sync Packet | 8 | 656 |
| Bus Idle | max | 500 |
| Data Packet | 28 | 2410 |
| Bus Idle | min | 750 |
| Total |  | 4316 |

The sequence shown in table 3-2 begins with the transmission of the sync packet by the timing master, which includes the unique address of the subordinate that is allowed to transmit on the bus. As shown, the subordinate has a maximum of 500 µs where the bus is idle to begin transmitting the data packet. After the data packet is transmitted, the timing master delays for a bus idle time (for example, 750 µs). The time on the bus required to transmit a 28-byte packet is 4.316 ms.

Table 3-3 shows a timing sequence where no data is transmitted.

TABLE 3-3

FX Sync Frame Timing
No Data Packet

|  | Bytes | Time (µs) |
|---|---|---|
| Sync Packet | 8 | 656 |
| Bus Idle | min | 750 |
| Total |  | 1406 |

The sequence shown in table 3-3 begins with the transmission of the sync packet by the timing master, which includes the unique address of the subordinate that is allowed to transmit on the bus. The subordinate has a maximum of 500 µs where the bus is idle to begin transmitting the data packet. In this example, the subordinate does not have data to transmit. Accordingly, the timing master delays for a bus idle time (for example, 750 µs). The time on the bus required to offer the bus to a non-transmitting subordinate is 1.406 ms.

As shown above in Tables 3-1, 3-2, and 3-3, the FX bus control scheme allows for a more efficient use of the bus. For example, the network 300 includes seven devices. The time on the bus required to transmit a full 64-byte packet is 7.466 ms. However, most devices on a lighting control network have no data to transmit the majority of the time. In a TDMA bus control system, each device on the network 300 would be allocated a full data payload (7.466 ms), for a total cycle time of 52.26 ms, regardless of how many devices are transmitting data or the sizes of the data packets. In contrast, an FX bus variably allocates time on the bus to devices based on how much data they have to transmit. For example, if only one device on the network 300 had data to transmit, the total cycle time would be 15.9 ms—a reduction of nearly 70%.

As described above, an FX bus is controlled by a timing master. In some embodiments, timing masters may be one of two classes: dominant timing masters and subordinate timing masters. Dominant timing masters (e.g., a network gateway device, such as a room controller, a network bridge, or a mesh radio) always want to be the timing master for any bus on which they communicate. Subordinate timing masters (e.g., a lighting fixture or stand-alone fixture control module) may either be a master or a subordinate, depending on what other devices are in the system. If a dominant timing master is detected, a subordinate timing master will become a timing subordinate. In some embodiments, dominant masters operate in a mode that is backwards compatible with SmartPORT slot-based timing or peer-to-peer token passing modes. In some embodiments, a fixture control module will start in timing master mode so it may control the resources within the fixture. When a network first starts up, the timing master is determined by each device on the network determining its mode of operation (e.g., master operation mode or subordinate operation mode).

Figure 4:
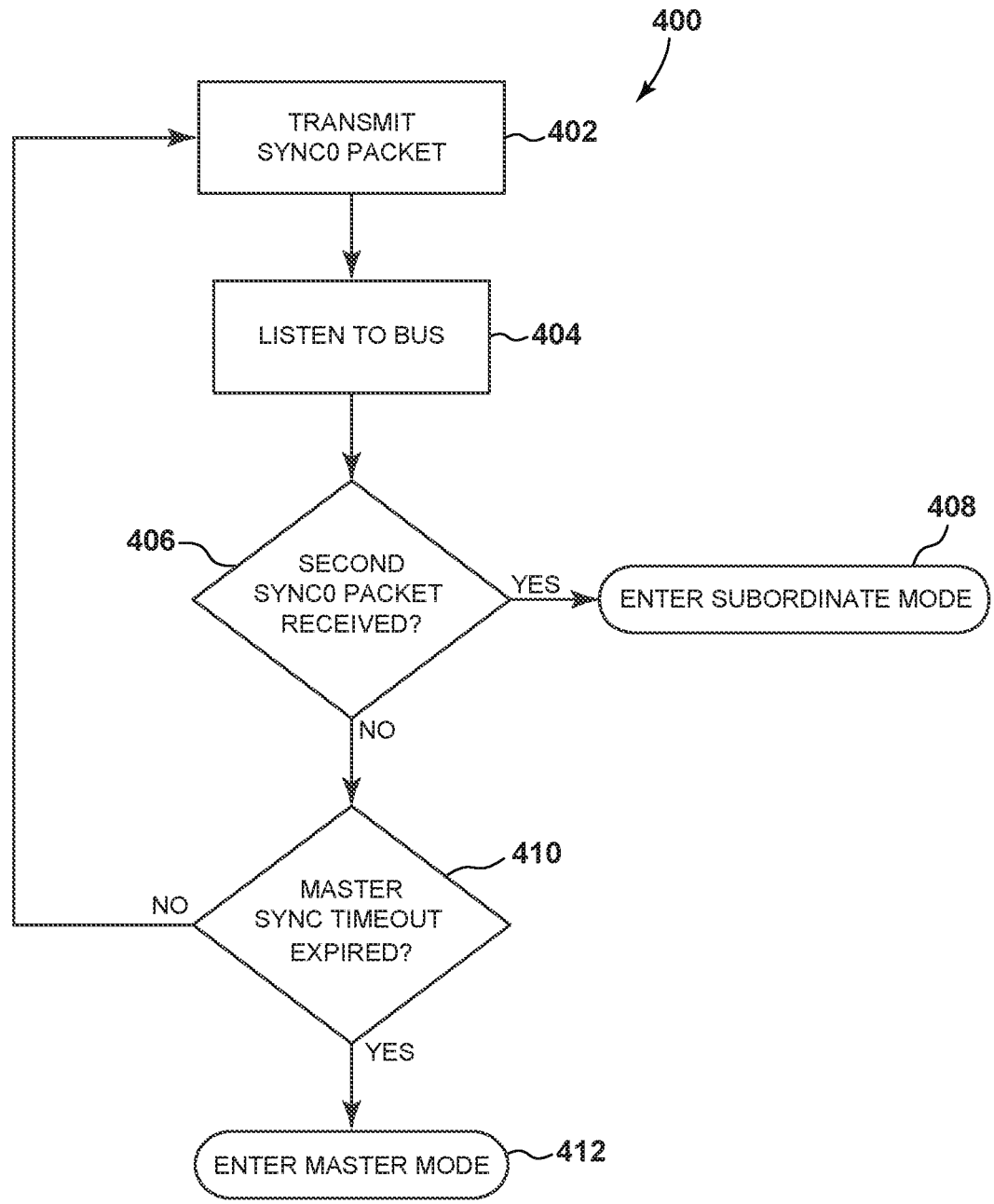
FIG. 4 is a flowchart illustrating a method for automatically selecting the operation mode of the lighting fixture of FIG. 1, according to some embodiments.

FIG. 4 illustrates an example method 400 for automatically determining a master for an FX bus, for example, the external bus 106 of FIG. 3. The method 400 is described as being performed by the integrated lighting fixture 100 and, in particular, the microprocessor 82 of the edge gate 80, over the external bus 106. However, it should be understood that in some embodiments, portions of the method 400 may be performed by other devices, including for example, the microcontroller 22, on other buses, for example, the internal bus 104.

At block 402, the microprocessor 82 transmits, to the external bus 106, a sync packet including a unique address of the edge gate 80. In some embodiments, this packet is known as a sync0 packet. At block 404, the microprocessor 82 listens, via the transceiver 84, on the external bus 106. The microprocessor 82 is listening for a sync packet from another device on the external bus 106. At block 406, when a second sync packet is received from the external bus during a master sync timeout period (e.g., a time when the bus is idle), the microprocessor 82 enters the subordinate operational mode (at block 408). The reception of a second sync packet indicates that another device on the network is acting as the timing master (e.g., a dominant master) or negotiating to be the timing master. In some embodiments, the microprocessor 82 only enters the subordinate operational mode when the second sync packet includes a unique address that is numerically higher than its own unique address. As a consequence, the edge gate 80 with the numerically highest unique address becomes the timing master. When a master sync timeout period expires (at block 410) without receiving a second sync packet including a unique address for a second master device from the external bus (at block 406), the microprocessor 82 enters a master operation mode (at block 412) and becomes the timing master for the network. When the timeout period has not expired, the microprocessor 82 sends out another sync packet (at block 402) and continues listening for other sync packets.

Figure 5:
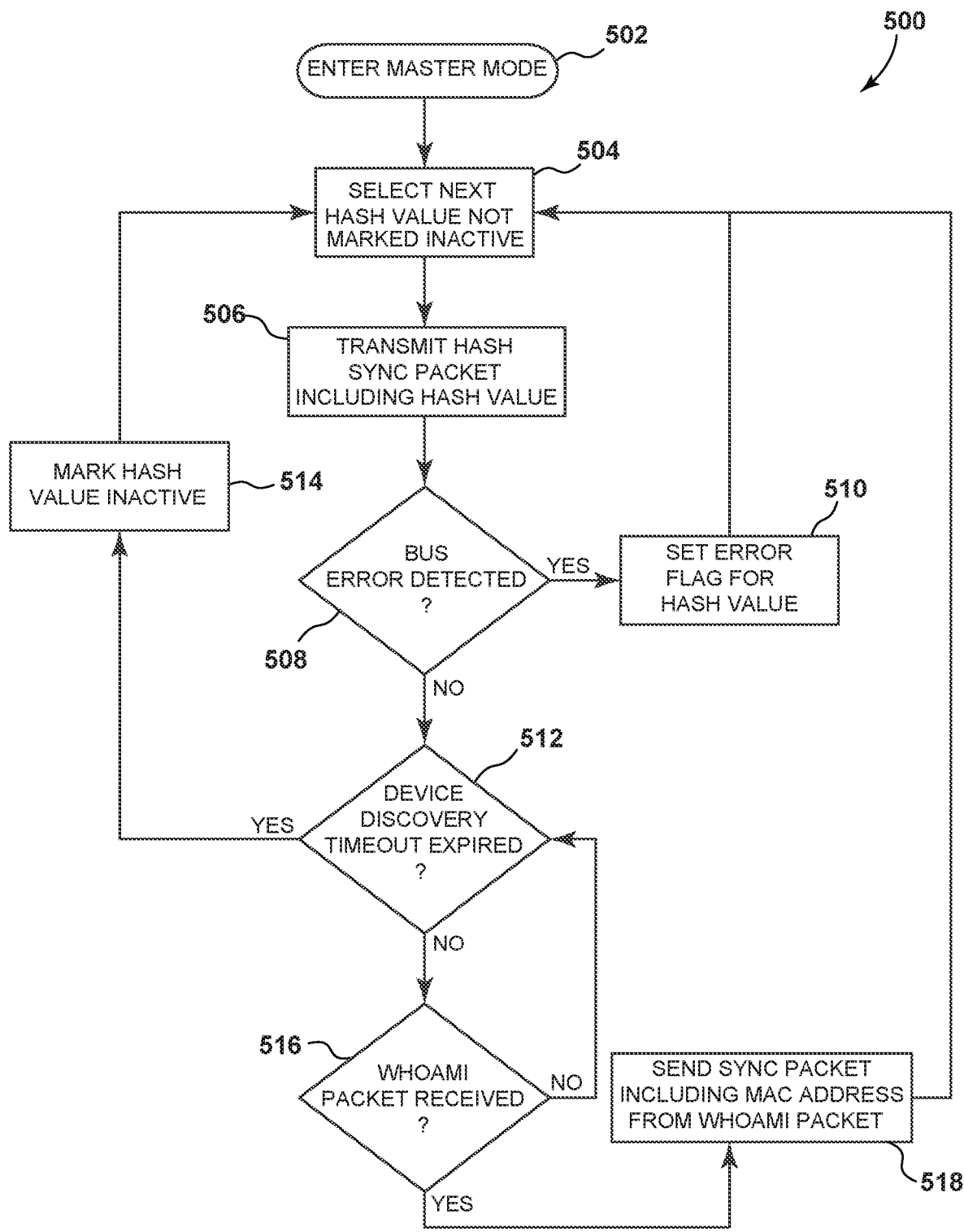
FIG. 5 is a flowchart illustrating a method for automatically discovering subordinate devices on the network of FIG. 3, according to some embodiments.

When a device, for example, the edge gate 80 of the lighting fixture 100, determines that it is a timing master (e.g., according to the method 400), it discovers the subordinate devices on the bus. FIG. 5 illustrates an example method 500 for discovering subordinate devices. Like the method 400, the method 500 is described, as an example, as being performed by the integrated lighting fixture 100 and, in particular, the microprocessor 82 of the edge gate 80, over the external bus 106.

In some embodiments, a timing master uses hash values of 0-255 to discover the subordinate devices on the bus. In the example embodiment described, each subordinate device (e.g., the lighting fixtures 120, 130, 140, 150, and 160) computes three single-byte hashes. One hash is based on the unique address for the device. A second hash is based on the CPU ID for the device. A third hash is based on an XOR (exclusive or) combination of the unique address and the CPU ID. Although it may be possible for two devices to share a hash, there is a low probability that any two devices will share all three hashes in common.

The method 500 begins with the edge gate 80 operating in the master mode (at block 502) (e.g., as determined using the method 400). At block 504, the microprocessor 82 selects a hash value that has not been marked inactive. At the start of the discovery process, none of the 256 hashes has been marked inactive, and the microprocessor 82 begins with the first hash value. At block 506, the microprocessor 82 transmits a hash sync packet. A hash sync packet is a sync packet that indicates a hash mode (see Table 2). The hash sync packet also includes the hash type and the hash value. The hash type may be the unique address hash, CPU hash, or XOR hash, as noted above. In other embodiments, other hash types may be employed. The microprocessor 82 iterates through the hash values for each hash type until all hash values for each type are marked inactive.

When a subordinate device receives a hash sync packet, it compares the hash value in the sync packet with its predetermined hash value of the same hash type. When the hash values match, the subordinate device transmits a self-identifying packet (e.g., a WhoAmI packet. The self-identifying packet includes, among other things, the subordinate device unique address for the subordinate device (e.g., the unique address of the subordinate edge gate). The self-identifying packet may also include area/zone/group information for the subordinate device.

At block 508, the microprocessor 82 determines whether a bus error is detected. A bus error may occur when two subordinate devices share a hash value and hash type, and try to respond to the hash sync packet at nearly the same time, creating a collision on the bus. When an error is detected, the microprocessor 82 sets an error flag for the hash value (at block 510), indicating that there may be two or more devices that share the hash.

When an error is not detected, the microprocessor 82 checks that the device discovery timeout period has not expired (at block 512). The device discovery timeout period is a time period of bus idle time (e.g., 500 μs) that indicates no device is responding to the hash sync packet. When the device discovery timeout period expires without receipt of a self-identifying packet (at block 516), the microprocessor 82 marks the hash value as inactive, and iterates the process with the next hash value (at block 504).

When the device discovery timeout has not expired and a self-identifying packet has been received (at block 516), the microprocessor 82 transmits a sync packet including the unique address (as received in the self-identifying packet) for the subordinate device. When this packet is received by the subordinate device, it is silenced (i.e., it enters a silent operation mode) for the remainder of the discovery process. This prevents it from responding unnecessarily to hash sync packets for its other hash types, and reduces the time for the discovery process to complete. After silencing the subordinate device (at block 518), the microprocessor 82 proceeds with the next hash value (at block 504). In some embodiments, the microprocessor 82 iterates through all 256 hash values for a hash type, and then sends sync packets to silence the devices found before proceeding to the next hash type.

Figure 6:
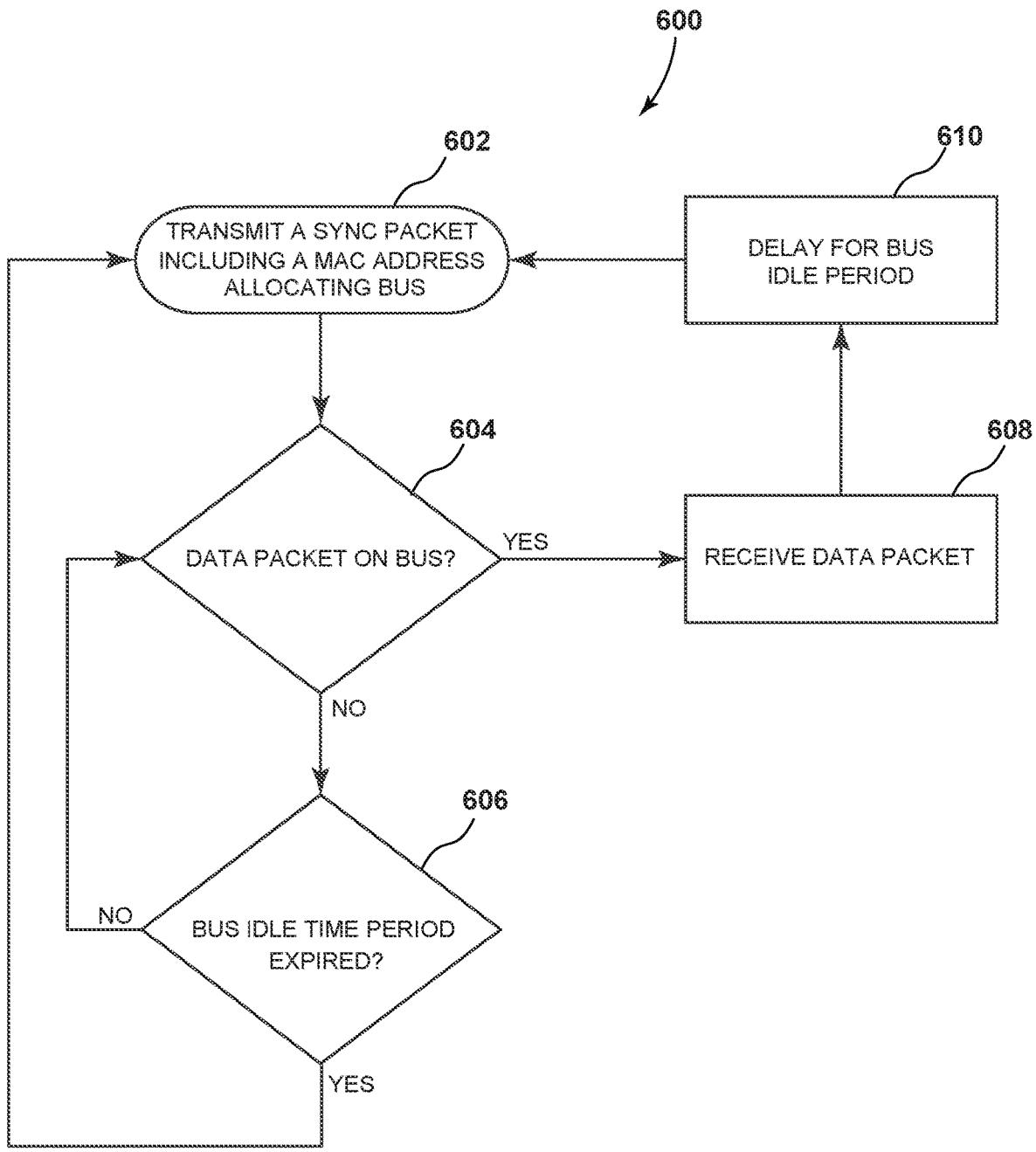
FIG. 6 is a flowchart illustrating a method for controlling network traffic on the network of FIG. 3, according to some embodiments.

When the timing master has discovered all of the subordinate devices on the bus, it may begin timing the bus to control traffic. FIG. 6 illustrates an example method 600 for timing the FX bus. Like the methods 400 and 500, the method 600 is described, as an example, as being performed by the integrated lighting fixture 100 and, in particular, the microprocessor 82 of the edge gate 80, over the external bus 106.

At block 602, the microprocessor 82 transmits a sync packet including a unique address for one of the subordinate devices. For example, with respect to FIG. 3, if lighting fixture 100 is the timing master, the unique address may be the unique address of one of the lighting fixtures 120, 130, 140, 150, and 160. The sync packet allocates the bus for data transmission to the device whose unique address is included in the sync packet. A subordinate device will only try to transmit data when it sees a sync packet with its unique address. The microprocessor 82 delays for a bus idle time period (e.g., 750 μs) to allow the device corresponding to the unique address to transmit a variable-length data packet to the external bus. At block 604, the microprocessor 82 checks for a data packet on the bus. When a data packet appears on the bus, the microprocessor 82 receives the data packet (at block 608). When the data packet is received, the microprocessor 82 delays for a bus idle period (e.g., 750 μs) and transmits another sync packet (at block 602). The next sync packet includes the unique address for the next subordinate to which the bus will be allocated. When the timing master has traffic to send on the bus, it transmits a sync packet with its own unique address, and then transmits a data packet.

When the bus idle time expires without a data packet appearing on the bus (at block 606), the microprocessor 82 transmits another sync packet (at block 602), including either its own unique address of the unique address for the next subordinate to which the bus will be allocated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter. The foregoing detailed description of the certain example embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the example embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientation descriptors are intended to facilitate the description of the example embodiments of the present application, and are not intended to limit the structure of the example embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A lighting fixture comprising:
a controller;
a sensor;
an internal bus communicatively coupling the controller and the sensor; and
an edge gate, including a microprocessor communicatively coupled to the internal bus and an external bus, and configured to
(a) transmit, to the external bus, a sync packet including a unique address of the edge gate;
(b) listen on the external bus;
(c) enter a master operation mode when a master sync timeout period expires without receiving a second sync packet including a unique address for a second master device from the external bus;
(d) receive, from the external bus, a hash sync packet;
(e) transmit, on the external bus, a self-identifying packet including the unique address of the edge gate in response to receiving the hash sync packet;
(f) receive, from the external bus, a third sync packet including the unique address of the edge gate; and
(g) in response to receiving the third sync packet, enter a silent operation mode.

2. The lighting fixture of claim 1, wherein the microprocessor is further configured to enter a subordinate operation mode when the second sync packet is received from the external bus during the master sync timeout period.

3. The lighting fixture of claim 1, wherein the microprocessor is further configured to repeat (a) and (b) until the master sync timeout period expires or the second sync packet is received.

4. The lighting fixture of claim 1, wherein, while in the master operation mode, the microprocessor is further configured to
(h) for each of a plurality of hash values not marked as inactive;
transmit, for each of a plurality of hash values not marked as inactive, to the external bus, a hash sync packet including the hash value;
transmit, on the external bus, a sync packet including the subordinate device unique address for the subordinate device when a self-identifying packet including a subordinate device unique address for a subordinate device is received on the external bus before a device discovery timeout period expires; and
mark the hash value as inactive when the device discovery timeout period expires without receiving network traffic on the external bus; and
(i) repeat (h) until each of the plurality of hash values is marked inactive.

5. The lighting fixture of claim 4, wherein the microprocessor is further configured to, while in the master operation mode,
(j) transmit, to the external bus, a sync packet including a unique address allocating the external bus for data transmission;
(k) delay for a bus idle time period to allow the device corresponding to the unique address to transmit a variable-length data packet to the external bus; and
repeat (j) and (k) at least one time.

6. The lighting fixture of claim 5, wherein
the unique address allocating the external bus for data transmission is the unique address of the edge gate; and
the microprocessor is further configured to transmit, on the external bus, the variable-length data packet from the edge gate during the bus idle time period.

7. The lighting fixture of claim 5, wherein the unique address allocating the external bus for data transmission is the subordinate device unique address; and
the microprocessor is further configured to
receive, from the external bus, a variable-length data packet from the subordinate device during the bus idle time period; and
when the variable-length data packet is addressed to at least one device on the internal bus, re-transmit the variable-length data packet on the internal bus.

8. The lighting fixture of claim 1, wherein the microprocessor is further configured to
delay for a predetermined period when a bus error is detected in response to transmitting the self-identifying packet;
receive, from the external bus, a second hash sync packet including a hash value;
compare the hash value to a predetermined hash value for the edge gate; and
transmit, on the external bus, the self-identifying packet when the hash value matches the predetermined hash value.

9. A method for operating a lighting fixture control module, the method comprising:
(a) transmitting, with a microcontroller via a transceiver, a sync packet including a unique address of the lighting fixture control module to a bus;
(b) listening, via the transceiver, on the bus;
(c) placing the microcontroller into a master operation mode when a master sync timeout period expires without receiving a second sync packet including a unique address for a second master device from the bus;
(d) receiving, from the bus, a hash sync packet;
(e) transmitting, on the bus, a self-identifying packet including the unique address of the edge gate in response to receiving the hash sync packet;
(f) receiving, from the bus, a third sync packet including the unique address of the edge gate; and
(g) entering a silent operation mode in response to receiving the sync packet.

10. The method of claim 9, further comprising: placing the microcontroller into a subordinate operation mode when the second sync packet is received from the bus during the master sync timeout period.

11. The method of claim 9, further comprising:
repeating (a) and (b) until the master sync timeout period expires or the second sync packet is received.

12. The method of claim 9, further comprising:
while in the master operation mode,
(h) for each of a plurality of hash values not marked as inactive;
transmitting, to the bus, a hash sync packet including the hash value;
transmitting, to the bus, a sync packet including the subordinate device unique address for the subordinate device when a self-identifying packet including a subordinate device unique address for a subordinate device is received from the bus before a device discovery timeout period expires; and
marking the hash value as inactive when the device discovery timeout period expires without receiving network traffic on the external bus; and (i) repeating (h) until each of the plurality of hash values is marked inactive.

13. The method of claim 12, further comprising:
while in the master operation mode,
- (j) transmitting, to the bus, a sync packet including a unique address allocating the external bus for data transmission;
- (k) delaying for a bus idle time period to allow the device corresponding to the unique address to transmit a variable-length data packet on the bus; and
repeating (j) and (k) at least once.

14. The method of claim 13, further comprising:
transmitting, on the bus, the variable-length data packet from the edge gate during the bus idle time period;
wherein transmitting a sync packet including a unique address allocating the external bus for data transmission includes transmitting the unique address of the edge gate.

15. The method of claim 9, further comprising:
detecting a bus error during transmission of the self-identifying packet;
responsive to detecting the bus error, delaying for a predetermined period;
receiving, from the bus, a second hash sync packet including a hash value;
comparing the hash value to a predetermined hash value for the fixture module controller; and
transmitting, on the bus, the self-identifying packet when the hash value matches the predetermined hash value.

16. A lighting fixture control module comprising:
a microcontroller communicatively coupled to a bus, and configured to
- (a) transmit, to the bus, a sync packet including a unique address of an edge gate;
- (b) listen on the bus;
- (c) enter a master operation mode when a master sync timeout period expires without receiving a second sync packet including a unique address for a second master device from the bus;
- (d) while in the master operation mode,
    for each of a plurality of hash values not marked as inactive;
    transmit, to the external bus, a hash sync packet including the hash value;
    transmit, on the bus, a sync packet including the subordinate device unique address for the subordinate device when a self-identifying packet including a subordinate device unique address for a subordinate device is received on the bus before a device discovery timeout period expires; and
    mark the hash value as inactive when the device discovery timeout period expires without receiving network traffic on the bus;
- (e) repeat (d) until each of the plurality of hash values is marked inactive;
- (f) transmit, to the bus, a sync packet including the subordinate device unique address allocating the bus for data transmission;
- (g) delay for a bus idle time period to allow the subordinate device to transmit a variable-length data packet to the bus;
repeat (f) and (g) at least one time; and
receive, from the external bus, a hash sync packet;
transmit, on the external bus, a self-identifying packet including the unique address of the edge gate in response to receiving the hash sync packet;
receive, from the external bus, a third sync packet including the unique address of the edge gate; and
in response to receiving the third sync packet, enter a silent operation mode.

17. The lighting fixture control module of claim 16, wherein the microcontroller is further configured to enter a subordinate operation mode when the second sync packet is received from the external bus during the master sync timeout period.

18. The lighting fixture control module of claim 16, wherein the microcontroller is further configured to repeat (a) and (b) until the master sync timeout period expires or the second sync packet is received.

* * * * *